United States Patent [19]
Miyamori

[11] Patent Number: 5,410,708
[45] Date of Patent: Apr. 25, 1995

[54] MULTI-REGISTER INTERRUPT CONTROLLER WITH MULTIPLE INTERRUPT DETECTION CAPABILITY

[75] Inventor: Takashi Miyamori, Tokyo, Japan

[73] Assignee: Kabushiki Kaisha Toshiba, Kawasaki, Japan

[21] Appl. No.: 733,121

[22] Filed: Jul. 19, 1991

[30] Foreign Application Priority Data

Jul. 25, 1990 [JP] Japan .................................. 2-194714

[51] Int. Cl.⁶ .............................................. G06F 9/00
[52] U.S. Cl. ................................... 395/725; 395/800; 395/375
[58] Field of Search ............... 395/600, 650, 725, 425, 395/275, 375, 800; 340/825.5

[56] References Cited

U.S. PATENT DOCUMENTS

| | | | |
|---|---|---|---|
| 4,080,649 | 3/1978 | Calle et al. | 395/725 |
| 4,091,447 | 5/1978 | Dillon et al. | 395/725 |
| 4,177,513 | 12/1979 | Hoffman et al. | 395/650 |
| 4,470,111 | 9/1984 | Jenkins et al. | 395/275 |
| 4,630,041 | 12/1986 | Casamatta et al. | 340/825.5 |
| 4,636,944 | 1/1987 | Hodge | 395/725 |
| 4,761,732 | 8/1988 | Eldumiati et al. | 395/425 |
| 5,051,945 | 9/1991 | Hayashi | 395/725 |
| 5,101,497 | 3/1992 | Culley et al. | 395/725 |
| 5,133,056 | 7/1992 | Miyamori | 395/275 |
| 5,230,048 | 7/1993 | Moy | 395/600 |

FOREIGN PATENT DOCUMENTS 0347082 12/1989 European Pat. Off. .

OTHER PUBLICATIONS

Patent Abstracts of Japan, vol. 11, No. 5 Jan. 8, 1987.
IBM Technical Disclosure Bulletin, vol. 32, No. 8A, Jan. 1990, pp. 323-325 "Mechanism For Sharing Edge-Sensitive Interrupts".

Primary Examiner—Alyssa H. Bowler
Attorney, Agent, or Firm—Foley & Lardner

[57] ABSTRACT

An interrupt controller has an interrupt controller, an interrupt control register having registers each including first and second flip-flops, a channel selector, and a read/write circuit. The interrupt controller receives interrupt requests from external devices and transmits these interrupt requests to external processing devices. The interrupt control register includes registers for recording data to control operation of the interrupt controller and the state of a plurality of interrupt requests. The channel selector assigns one register from the registers. The first flip-flop indicates the generation of an initial interrupt request. The second flip-flop indicates the generation of following interrupt requests when the first flip-flop has already been set to indicate the generation of the initial interrupt request. The read/write means, connected to the second flip-flop, writes data into the second flip-flop based on control signals from the external devices and outputs the data of the second flip-flop to the external devices.

2 Claims, 8 Drawing Sheets

| A1 | A2 | A3 | ASSIGNED INTERRUPT CONTROL REGISTER |
|---|---|---|---|
| 0 | 0 | 0 | INTERRUPT CONTROL REGISTER #0 |
| 0 | 0 | 1 | INTERRUPT CONTROL REGISTER #1 |
| 0 | 1 | 0 | INTERRUPT CONTROL REGISTER #2 |
| 0 | 1 | 1 | INTERRUPT CONTROL REGISTER #3 |
| 1 | 0 | 0 | INTERRUPT CONTROL REGISTER #4 |
| 1 | 0 | 1 | INTERRUPT CONTROL REGISTER #5 |
| 1 | 1 | 0 | INTERRUPT CONTROL REGISTER #6 |
| 1 | 1 | 1 | INTERRUPT CONTROL REGISTER #7 |

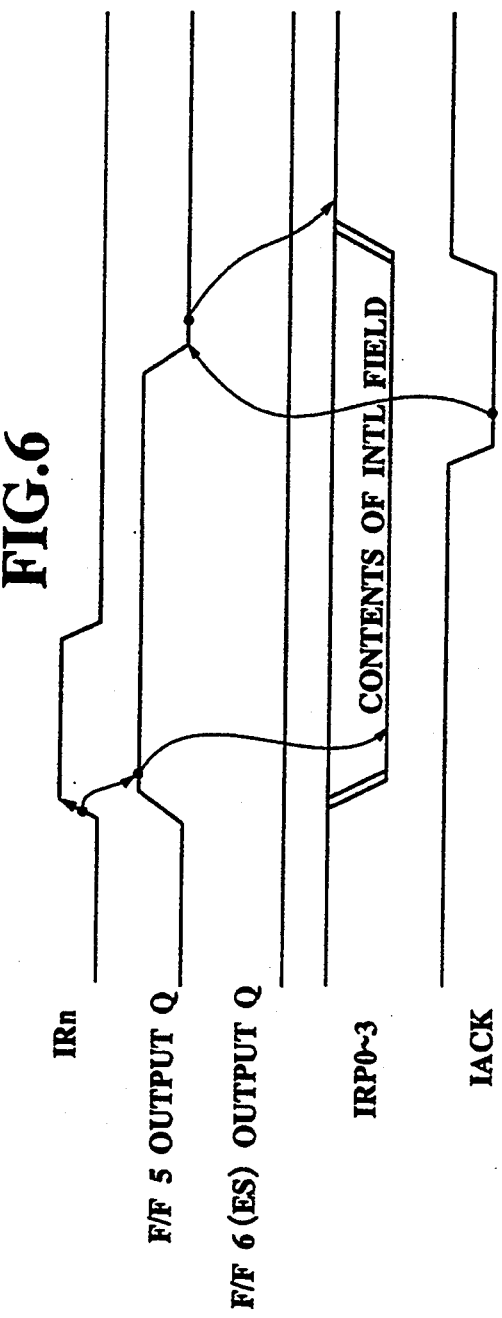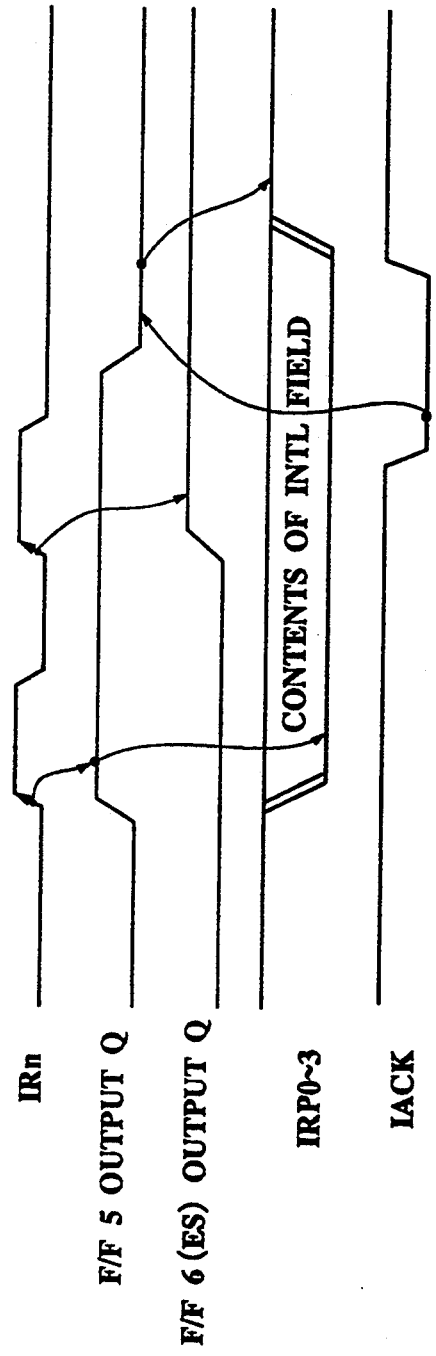

FIG.9

EDGE COUNT REGISTER n
(n=0~7)

FIG.10

| A1 | A2 | A3 | A3 | ASSIGNED REGISTER |
|---|---|---|---|---|
| 0 | 0 | 0 | 0 | INTERRUPT CONTROL REGISTER #0 |
| 0 | 0 | 1 | 0 | INTERRUPT CONTROL REGISTER #1 |
| 0 | 1 | 0 | 0 | INTERRUPT CONTROL REGISTER #2 |
| 0 | 1 | 1 | 0 | INTERRUPT CONTROL REGISTER #3 |
| 1 | 0 | 0 | 0 | INTERRUPT CONTROL REGISTER #4 |
| 1 | 0 | 1 | 0 | INTERRUPT CONTROL REGISTER #5 |
| 1 | 1 | 0 | 0 | INTERRUPT CONTROL REGISTER #6 |
| 1 | 1 | 1 | 0 | INTERRUPT CONTROL REGISTER #7 |
| 0 | 0 | 0 | 1 | EDGE COUNT REGISTER #0 |
| 0 | 0 | 1 | 1 | EDGE COUNT REGISTER #1 |
| 0 | 1 | 0 | 1 | EDGE COUNT REGISTER #2 |
| 0 | 1 | 1 | 1 | EDGE COUNT REGISTER #3 |
| 1 | 0 | 0 | 1 | EDGE COUNT REGISTER #4 |
| 1 | 0 | 1 | 1 | EDGE COUNT REGISTER #5 |
| 1 | 1 | 0 | 1 | EDGE COUNT REGISTER #6 |
| 1 | 1 | 1 | 1 | EDGE COUNT REGISTER #7 |

MULTI-REGISTER INTERRUPT CONTROLLER WITH MULTIPLE INTERRUPT DETECTION CAPABILITY

BACKGROUND OF THE INVENTION

1. Field of the Invention

The present invention relates to the configuration of an interrupt controller which issues requests for interrupt processing to a processor when an external device generates a leading or trailing edge in an interrupt request signal of the interrupt controller.

2. Description of the Prior Art

Conventionally, in a system provided with an interrupt controller, an interrupt request from an external device to a processor is assigned to the processor through an interrupt controller.

The interrupt request from the external device is assigned to the interrupt controller in the form of an edge trigger or a level trigger on an interrupt request signal. In the case of an edge trigger, the interrupt is requested when the interrupt signal changes from a high level to a low level or from a low level to a high level. However, in the case of a level trigger, the interrupt is requested based on a low level state or from a high level state of an interrupt request signal. The selection as to which of these triggers is used is made by the interrupt controller.

In the case where an interrupt is requested by an edge trigger, when the edge trigger is generated in the interrupt request signal, the interrupt controller recognizes the generation of an interrupt request from an external device, and enters the interrupt generation state. The interrupt request signal to the processor is then validated and the interrupt processing is requested from the controller.

Following this, when the processor responds to the interrupt request from the controller, the interrupt controller is released from the interrupt generation state by an interrupt acknowledge signal which is asserted by a processor during that interrupt acknowledge cycle. Alternatively, the interrupt controller is released from the interrupt generation state by the program during the interrupt processing corresponding to that interrupt request. The interrupt controller, on being released from the interrupt generation state, enters an interrupt non-generation state.

In an interrupt controller which changes between these two states, if an additional interrupt request signal is assigned as an edge trigger from an external device in the interrupt generation state, the edge trigger cannot be recognized. For this reason, the interrupt controller in the interrupt generation state cannot detect whether or not an edge trigger has been regenerated in the interrupt request signal and cannot distinguish whether the interrupt request has been made by means of one edge trigger interrupt request or whether the interrupt request has been made through a plurality of edge trigger interrupt requests.

SUMMARY OF THE INVENTION

An object of the present invention is to provide, with due consideration to the drawbacks of such conventional devices, an interrupt controller with the function of assigning to a processor recorded data about the state of generation of a plurality of interrupt requests (for example, the number of generation of interrupt request, and the like).

Accordingly, this object is achieved in the present invention by the provision of an interrupt controller which includes interrupt control means for receiving interrupt requests from a plurality of external devices according to the level transition of an interrupt request signal and transmitting those interrupt requests to an external processing device. The interrupt controller according to the invention also includes an interrupt control register, having a plurality of registers provided in the interrupt control means, for recording data to control the operation of the interrupt controller and the state (data) of a plurality of interrupt requests. Also included in an interrupt controller according to the invention is a channel selector for assigning one register from the plurality of registers; and a flip-flop for indicating the generation of the interrupt request by setting the data for the generation when the level transition is generated on the interrupt request signal. According to the invention the plurality of external devices and the plurality of registers are dealt with one at a time. Each register in the interrupt control register further includes an ES bit field for indicating generation of the level transition of a next interrupt request transferred from the external device when there has been an interrupt request from the same external device, so that the interrupt controller has already entered the interrupt state and the ES bit field can be read/written by a processor.

The interrupt controller of the present invention receives and records the generation status of interrupt request signals requested from a plurality of external devices.

Accordingly, the reliability of the system is improved, even in the case where interrupt request signals have been generated a plurality of times from the same external device, because the interrupt request status can be recorded and processing can be executed corresponding to this recorded data.

BRIEF DESCRIPTION OF THE DRAWINGS

FIG. 6 and FIG. 7 are timing charts showing the action of the ES bit field contained in the interrupt control register of FIG. 5.

FIG. 9 is a diagram showing the configuration of an edge count register used in another embodiment of the present invention.

FIG. 10 is a diagram showing the correspondence between the value of address bus signals and the assigned register.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Figure 1:
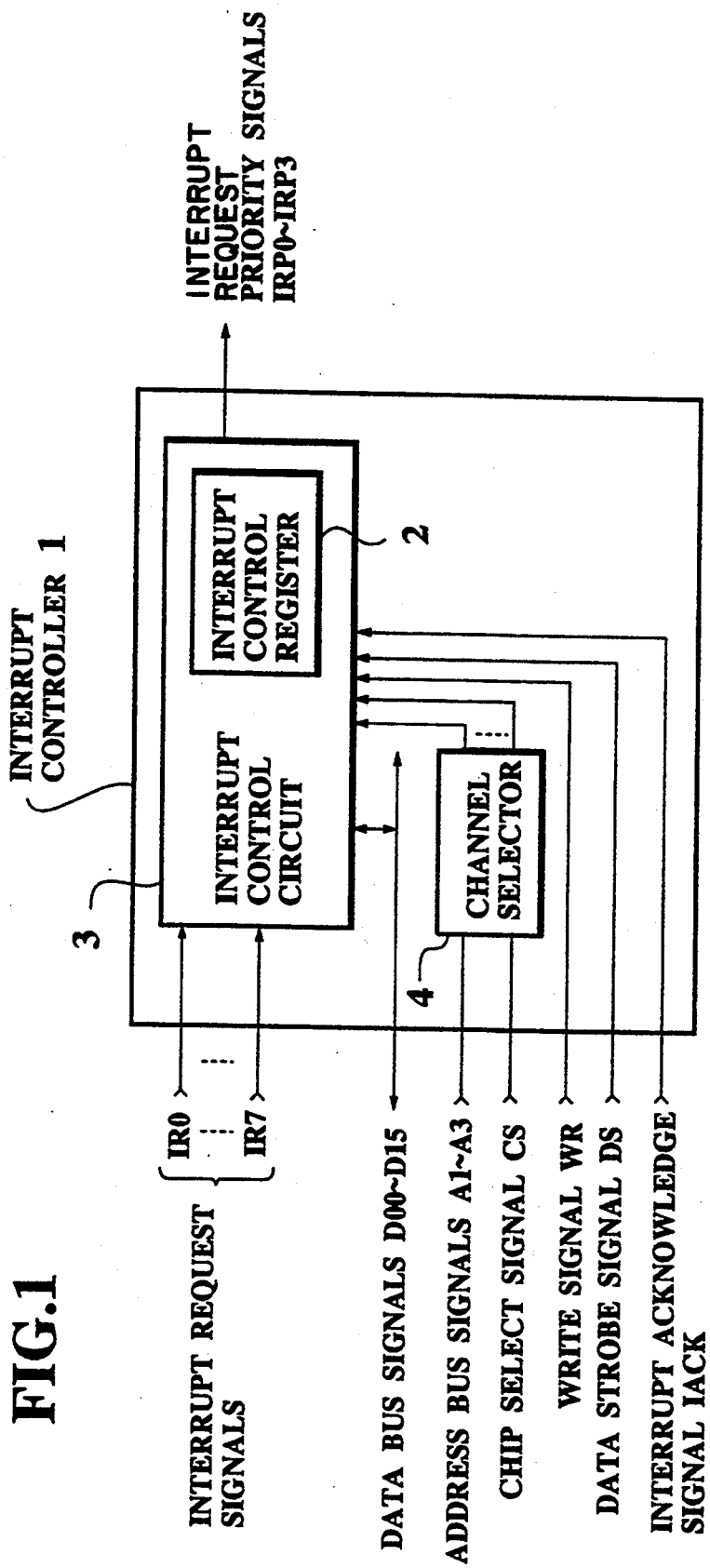
FIG. 1 is a diagram showing the configuration of an embodiment of an interrupt controller of the present invention.

FIG. 1 is a block diagram showing the configuration of a first embodiment of an interrupt controller of the present invention. In the embodiment shown in the drawing, when a further edge trigger is generated on an interrupt request signal while the interrupt controller is in the interrupt generation state, a flag is set. This flag state is then read out from a program, and an interrupt request signal generation state is recognized.

In FIG. 1, an interrupt controller 1 includes an interrupt control circuit 3 provided with an interrupt control register 2, and a channel selector 4.

The interrupt control register 2 for inputting and outputting data which assigns the actions of the interrupt controller 1 to an external device is provided. The interrupt control register 2 includes eight registers corresponding respectively to eight interrupt request signals IR0 to IR7 which are assigned to the interrupt controller 1 from an external device. These eight interrupt registers are assigned through address bus signals A1, A2, and A3.

Figure 2:
FIG. 2 is a diagram showing the configuration of an interrupt control register contained in the interrupt controller of FIG. 1.

Data which is stored in the interrupt control register 2 is organized in fields as shown in FIG. 2. In FIG. 2, an interrupt vector (INTV) field is provided for storing an interrupt vector for outputting by the interrupt controller 1 during an interrupt acknowledge cycle. An INTL field is provided for storing an interrupt level value for outputting by a processor when an interrupt request is received from an external device through an interrupt request signal IRn.

A trigger mode (TM) bit field is provided for storing data which is set when the interrupt request signal IRn sets either an edge trigger or a level trigger. In the case where the TM bit field is, for example, "1", an edge trigger is set, and an interrupt is generated when the interrupt request signal IRn changes from a low level to a high level. Conversely, when the TM bit field is "0", the level trigger mode is set, and an interrupt is generated when the interrupt request signal IRn is in the low level state.

An interrupt enable (IE) bit field is provided for indicating either approval or rejection of the generation of an interrupt through the interrupt request signal IRn. In the case where the IE bit field is "1", the interrupt controller 1 is an interrupt approval state, and an interrupt can be generated by the interrupt request signal IRn. When the IE bit field is "0", the interrupt controller 1 is an interrupt rejection. In the level trigger mode, if the interrupt request signal IRn is low level during the period when the IE bit is "0", the processor will not request an interrupt. On the other hand, if the IE bit is "0" during the edge trigger mode, an input edge trigger is retained internally and the interrupt request to the processor is reserved until the IE bit next becomes "1".

An automatic interrupt disable (AID) bit field is provided for controlling whether or not the IE bit is automatically set to "0" when an interrupt request received through the interrupt request signal IRn is accepted by the processor. If the interrupt acknowledge cycle is executed while the AID bit is "1", the IE bit automatically becomes "0" and the interrupt controller 1 becomes the interrupt rejection state. This function is not used when the AID bit is "0".

When an erroneous interrupt request signal IRn is active, an error (ES) bit is set to "1". Specifically, in the edge trigger mode, when an edge trigger has already been generated in the interrupt request signal IRn and an interrupt has been requested, if a next edge trigger is generated in this IRn signal, "1" is set in the ES bit until the interrupt acknowledge cycle of that interrupt request is completed.

In the interrupt control circuit 3 provided with this interrupt control register 2, when the edge trigger or the level trigger is input to the interrupt control circuit 3 through the interrupt request signal IRn, the interrupt controller enters the interrupt generation state internally in the interrupt control circuit 3. In this state, if the IE bit of the interrupt control register 2 becomes "1", the interrupt level set in the INTL field is output through a plurality of interrupt request priority signals IRP0 to IRP3, and an interrupt is requested from the processor. Subsequently, in the interrupt acknowledge cycle, when an interrupt acknowledge signal IACK enters the low level, the interrupt controller outputs the interrupt vector set in the INTV field of the interrupt control register 2 through a plurality of data bus signals D00 to D007, by means of the processor 1. Then, the interrupt controller is released from the interrupt generation state at the same time.

Figure 3:
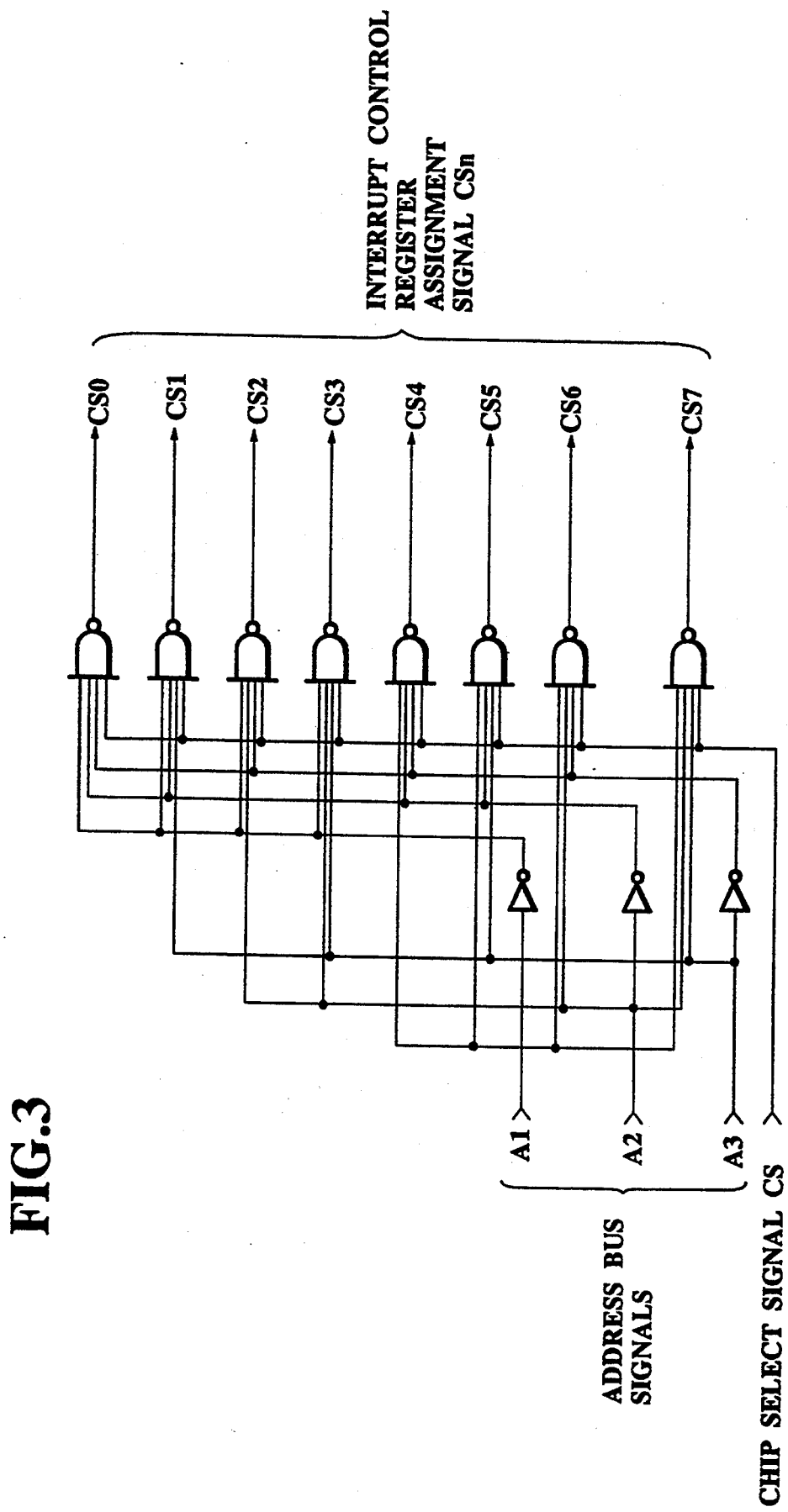
FIG. 3 is a diagram showing the configuration of a channel selector contained in the interrupt controller of FIG. 1.
Figures 4, 5:
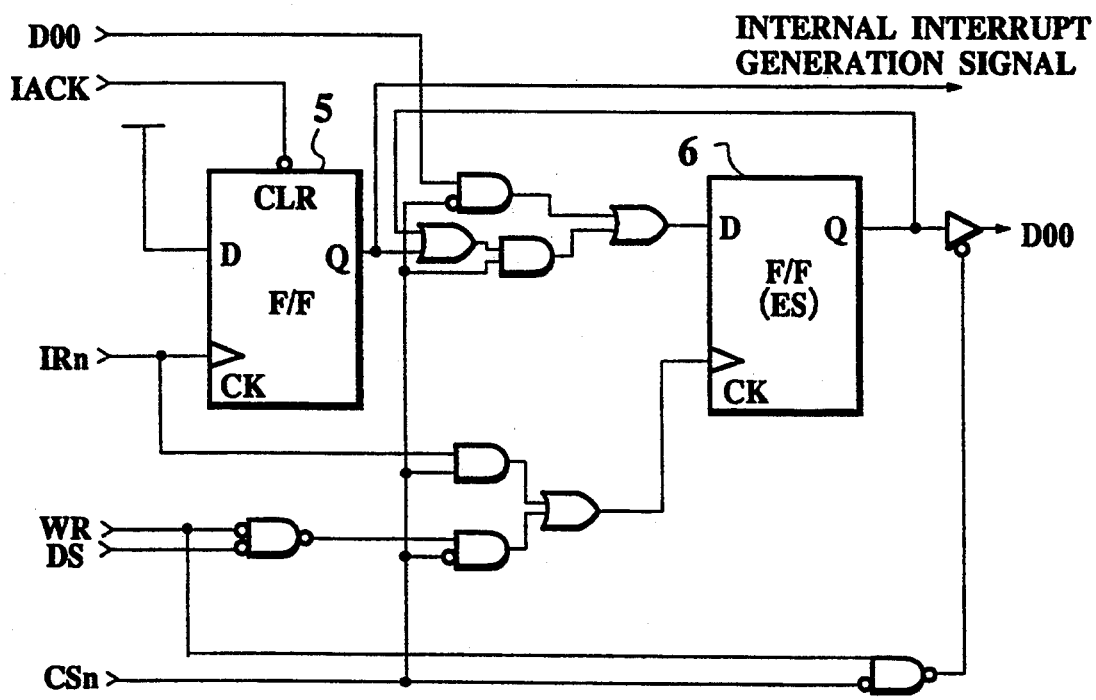
FIG. 4 is a diagram showing the relationship between the values of address bus signals and the assigned interrupt control register.
FIG. 5 is a circuit diagram of an ES bit field contained in an interrupt control register.

The channel selector 4 is a circuit for generating interrupt control register assignment signals for assigning a plurality of interrupt control registers #0 to #7 corresponding to each interrupt request signal. A chip select signal CS and address bus signals A1 to A3 are input from an external device when the interrupt control register 2 is accessed. The channel selector 4 has a configuration, for example, as shown in FIG. 3, and the interrupt control registers #0 to #7 are assigned respectively through the address bus signals A1 to A3, as shown in FIG. 4.

Next, the generation of the ES bit field of the interrupt control register 2 will be explained with reference to the circuit diagram shown in FIG. 5. The explanation will be made for the case where the TM bit field is set to "1", in the edge trigger mode.

A register F/F5 is provided for maintaining the interrupt generation state, and a flip-flop F/F6 is provided corresponding to the ES bit field. The register F/F5 and the flip-flop F/F6 are initially set to "0". The interrupt request signal IRn is input to the clock CK of the register F/F5, and when an edge trigger is input to the interrupt request signal IRn with the interrupt acknowledge signal IACK at the high level, the register F/F5 is set to "1" and the interrupt controller becomes the interrupt generation state.

In addition, if the chip select signal CSn is at the high level, the edge trigger of the interrupt request signal IRn is input to the clock CK of the register F/F5 at the same time. At this time, if an output Q of the register F/F5 is at the low level, the output Q of the flip-flop F/F6 is fed back to an input D of the flip-flop F/F6 so that the content of the register F/F5 remains "0".

The interrupt acknowledge signal IACK is input to a CLEAR terminal CLR of the register F/F5, and when the interrupt acknowledge signal IACK is at the low level in the interrupt acknowledge cycle, the content of the register F/F5 are cleared to "0".

In the configuration of this type, as shown in the interrupt operation timing chart of FIG. 6, when an edge trigger is generated on the interrupt request signal IRn, "1" is set in the register F/F5, and the output Q also enters the high level. In this state, if "1" is set in the IE bit field of the interrupt control register 2, the value in the INTL field is output as the interrupt request priority signals IRP0 to 3. Subsequently, when the interrupt acknowledge signal IACK enters the low level in the interrupt acknowledge cycle, register F/F5 is cleared to "0" and the output Q also enters the low level. As a result, the interrupt request priority signals IRP0 to IRP3 all become high level. The ES bit field does not change from this action.

Next, the case where the ES bit field changes will be explained. When an edge trigger is input to the interrupt request signal IRn and the register F/F5 is set to "1" the input D to the flip-flop F/F6 also becomes "1". In this state, when an edge trigger is once again input to the interrupt request signal IRn, the value "1" of the input D to the flip-flop F/F6 is latched so that the content of the flip-flop F/F6 become "1". Specifically, in the interrupt generation state, when the next edge trigger is input, "1" is set in the flip-flop F/F6.

Next, the timing will be explained with reference to FIG. 7.

Now referring to FIG. 7, when an edge trigger is generated in the interrupt request signal IRn, the register F/F5 is set to "1" and the output Q also enters the high level. If the IE bit field of the interrupt control register 2 is "1", the value in the INTL field is output as the interrupt request priority signals IRP0 to IRP3. Subsequently, when, prior to the start of the interrupt acknowledge cycle, the next edge trigger is generated in the interrupt request signal IRn, the flip-flop F/F6 is set to "1" and its output Q also becomes high level. Subsequently, when the interrupt acknowledge signal IACK is switched to the low level, the register F/F5 is cleared to "0" and the output Q also enters the low level. As a result, the interrupt request priority signals IRP0 to IRP3 all become high level. At this time, the content of the flip-flop F/F6 does not change but are maintained at "1". In this way, when an edge trigger is input to the interrupt request signal IRn and an interrupt is generated, the flip-flop F/F6 can indicate that the subsequent interrupt has been requested.

The flip-flop F/F6 corresponds to the ES bit field of the interrupt control register 2 and can be read and written by an external processor. In the case of a write operation, a write signal WR and the chip select signal CS enter the low level, and when the leading edge of a data strobe signal DS is input, the value of the data bus signal D00 is introduced as the contents of the flip-flop F/F6. In the case of a read operation the write signal WR becomes high level and the value in the flip-flop F/F6 is output as the data bus signal D00.

By the provision of this type of ES bit field (F/F6), the fact that the processing of the interrupt from the edge trigger cannot be handled can be recognized by reading out the contents of the interrupt control register 2 of the interrupt controller 1. Therefore in such a case the error can be handled by the program.

Figure 8:
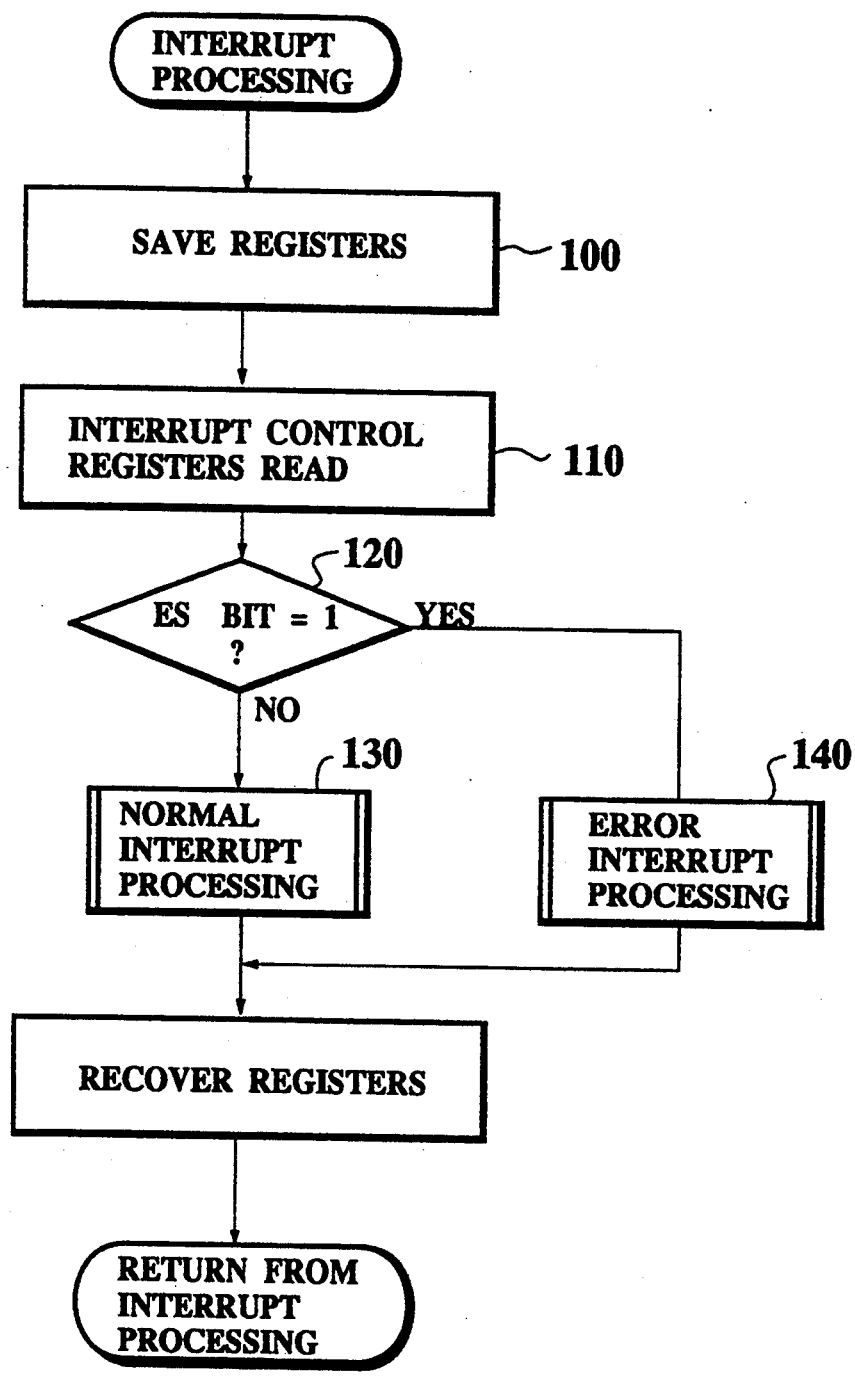
FIG. 8 is a process flow diagram of the interrupt controller of FIG. 1.

FIG. 8 is a process flow diagram showing the processing of an interrupt when the interrupt controller 1 of the present invention is used. The process flow of the interrupt process shown in FIG. 8 will now be described. First, the contents of the processor registers are saved (Step 100), after which the contents of the interrupt control register 2 are read out (Step 110) and the ES bit field (F/F6) is checked (Step 120). If the result of the check shows the contents of the ES bit field (F/F6) to be "0", this indicates that the interrupt processing by an edge trigger can be carried out and a normal interrupt processing is done (Step 130).

On the other hand if the contents of the ES bit field (F/F6) are "1", the interrupt request by means of an edge trigger is generated several times, an because the processor is unable to process the all interrupt requests, and error interrupt process is performed (Step 140). In this way it is possible to select the interrupt process to suit the generation state of the interrupt request signal.

Furthermore, the present invention is not limited to the embodiment described above. For example, the embodiment could be modified so that the ES bit field (F/F6) is structured as a counter to count the number of times the edge trigger is input.

A second embodiment of the present invention will now be explained. In the first embodiment the ES bit field shows whether or not a second interrupt request occurred while the first interrupt request is generated. However, with only the ES bit field it is not possible to know the number of interrupts which have been generated.

With this second embodiment of the present invention, an edge count register n (where n=0 to 7) is provided which counts the number of interrupts generated. The configuration of the edge count register is illustrated in FIG. 9. The edge count register is comprised of four bits. Read and write operations from external devices are possible, and, in such a case, either the interrupt control register or the edge count register is selected through the values of a plurality of address signals A1 to A4 as shown in FIG. 10.

Figure 11:
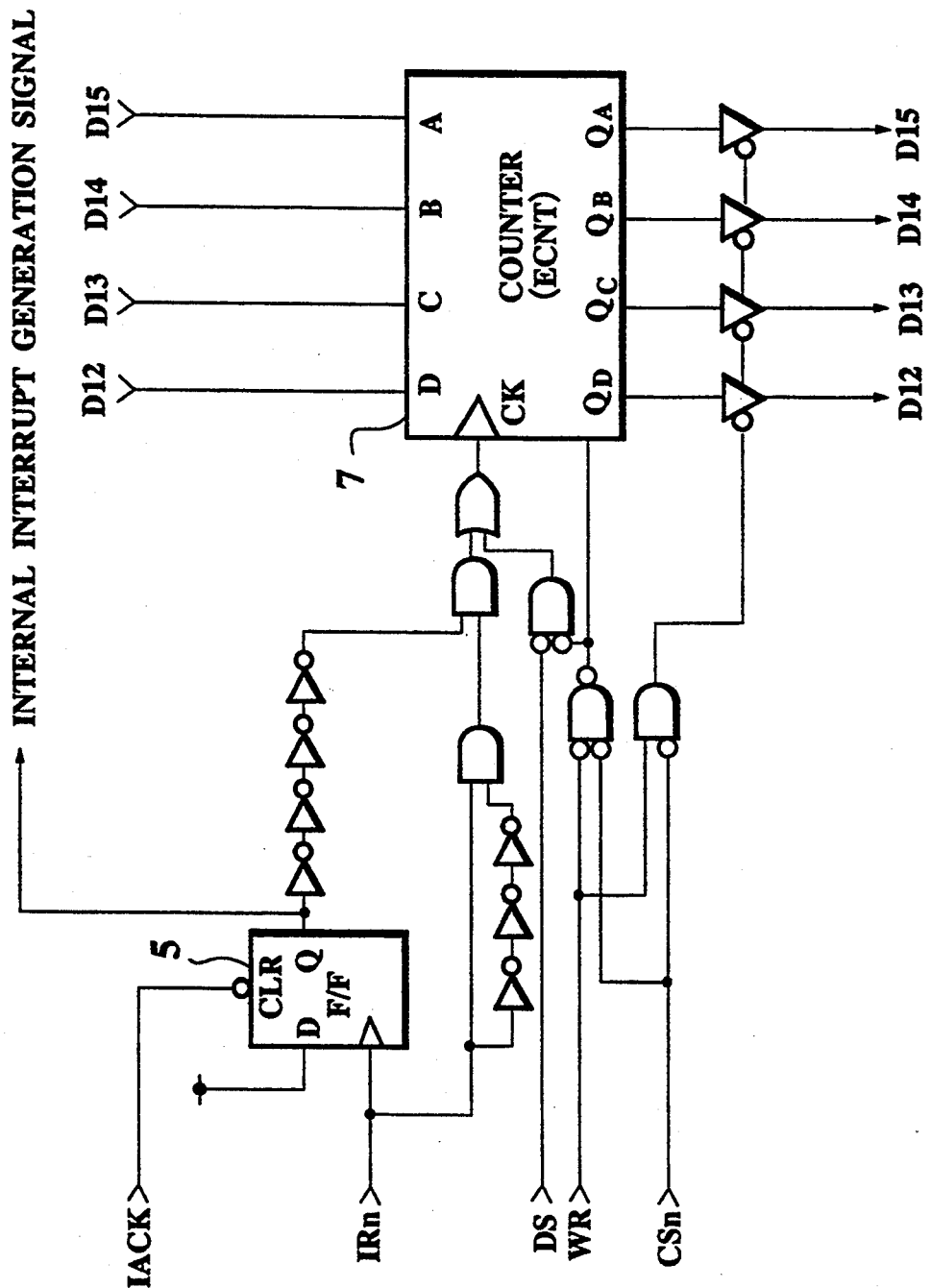
FIG. 11 is a circuit diagram of the edge count register of FIG. 9.

FIG. 11 is a circuit diagram of the edge count register. Here, an explanation will be given for the case of the edge trigger mode with the TM bit field =1.

The F/F5 register is maintained in the same interrupt generation state shown in FIG. 6. A counter 7 is a four-bit counter corresponding to an Error Count (ECNT) field. Initially, the register F/F5 is set to "0" and the counter 7 is set to "0000".

The interrupt request signal IRn is linked to the clock CK of the register F/F5, and when an edge trigger is input to the interrupt request signal IRn, the register F/F5 is set to "1" and the processor enters the interrupt generation state.

A leading edge in the clock CK of the counter 7 is generated when the register F/F5 is set to "1", and a leading edge is generated in the interrupt request signal or CS, WR, and DS change from the low level state to the high level state. In the latter case, because LOAD enters the low level, the values of D12, D13, D14, and D15 are set in the counter.

In the former case, LOAD is at the high level and the contents of the counter 7 are incremented by one. If the four bits of the counter are "1111", when an edge trigger is input to CK the contents of the counter are changed to "0000". Accordingly, the counter counts from "0000" to "1111". In the case where CSn is at the low level and WR is at the high level, a plurality of outputs QD, QC, QB, QA is output to the counter 7 and these are respectively output as a plurality of data bus signals D12, D13, D14, D15.

Figure 12:
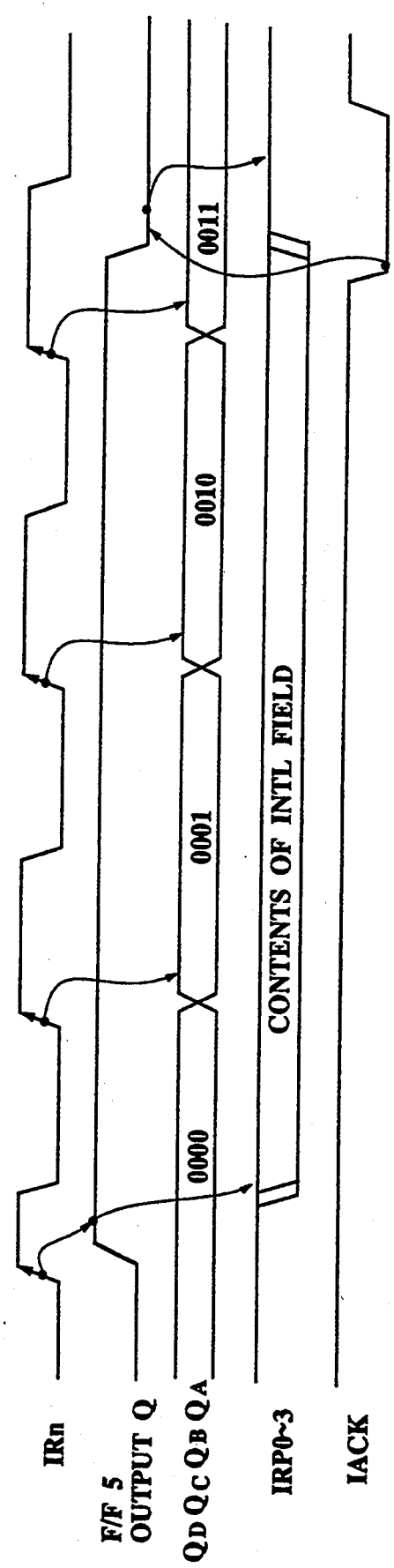
FIG. 12 is a timing chart showing the action of the edge count register of FIG. 9.

The action of the counter 7 will now be explained with reference to the timing chart of FIG. 12.

With the register F/F5 at "0" and in the state where interrupts are not generated, when a leading edge is generated in IRn, the register F/F5 is set to "1" and the interrupt controller enters the interrupt generation state. Because the register F/F5 is "0" during the input of the leading edge, the leading edge is not generated in the clock CK of the counter 7. Accordingly, the counter 7 remains unchanged at "0000". With the register F/F5 at "1", in the interrupt generation state, when a leading edge is generated in the interrupt request signal, leading edge IRn is generated in the clock CK of the counter 7, and the value of the counter 7 is incremented by 1 at each leading edge.

As can be clearly understood from the foregoing explanation, the provision of the counter 7 makes it possible to count the number of edge triggers newly generated during an interrupt generation state. As a result, if the value in the edge count register is read out by the interrupt processing program, it is possible to recognize the number of times that an edge trigger was generated before the interrupt was processed. Therefore the interrupt processing can be changed to correspond to that number of times.

In the present embodiment, the counter 7 has a four-bit structure and therefore can count from 0 to 15 only. However, it is possible to increase the number of bits and therefore increase the extent of the count (the number of edge triggers generated).

As can be clearly understood from the foregoing explanation, in the present invention, the interrupt controller enters the interrupt generation state and, until that state is released, if the same interrupt request occurs this interrupt request can be detected. The result of the detection can therefore be referenced externally so that it is possible to recognize if the interrupt processing has not functioned normally, making it possible to process interrupts to accommodate such a case. As a result, because of this invention, the reliability of a system provided with an interrupt controller according to the invention can be improved.

What is claimed is:

2. An interrupt controller according to claim 1, wherein the second flip-flop means comprises a counter counting a plurality of bits by which the number of a plurality of interrupt requests from the same external device is counted.

1. An interrupt controller comprising:

interrupt control means for receiving interrupt requests from at least one of a plurality of external devices according to level transitions of interrupt request signals and transmitting the interrupt requests to an external processing device;

interrupt control register means, comprising:

a plurality of registers for recording data to control operation of the interrupt controller and the states of a plurality of interrupt requests;.

channel selector means for assigning one register from the plurality of registers based on address bus signals and a chip select signal from the external processing device;

first flip-flop means for indicating the generation of an initial interrupt request by setting data for the generation when the level transition is generated on the interrupt request;

second flip-flop means for indicating the generation of a subsequent interrupt request when the first flip-flop means has already been set to indicate the generation of the initial interrupt request; and read/write means, connected to the second flip-flop means, for inputting data to the second flip-flop means based on a control signal transferred from the external processing devices and outputting the data of the second flip-flop means on the data bus signal to the external processing devices;

wherein each register in the interrupt control register has a first bit field for indicating a priority level for the interrupt request, and wherein the interrupt controller further comprises interrupt level output means for outputting the contents of the first bit field to the external processing device in order to request the interrupt operation when the subsequent interrupt request is required from the external devices and the first flip-flop means has already set the generation of the initial interrupt request; and wherein each register in the interrupt control register further has a second bit field for indicating whether or not the request of the interrupt operation to the external processing device is enabled, and the interrupt control means outputs the contents of the first bit field to the external processing device only when an interrupt request has occurred and when the contents of the second bit field indicates the interrupt operation is enabled.

* * * * *